Nov. 20, 1923.
H. PODOLSKY
1,474,731
FISHING APPARATUS
Filed June 3, 1920   4 Sheets-Sheet 4
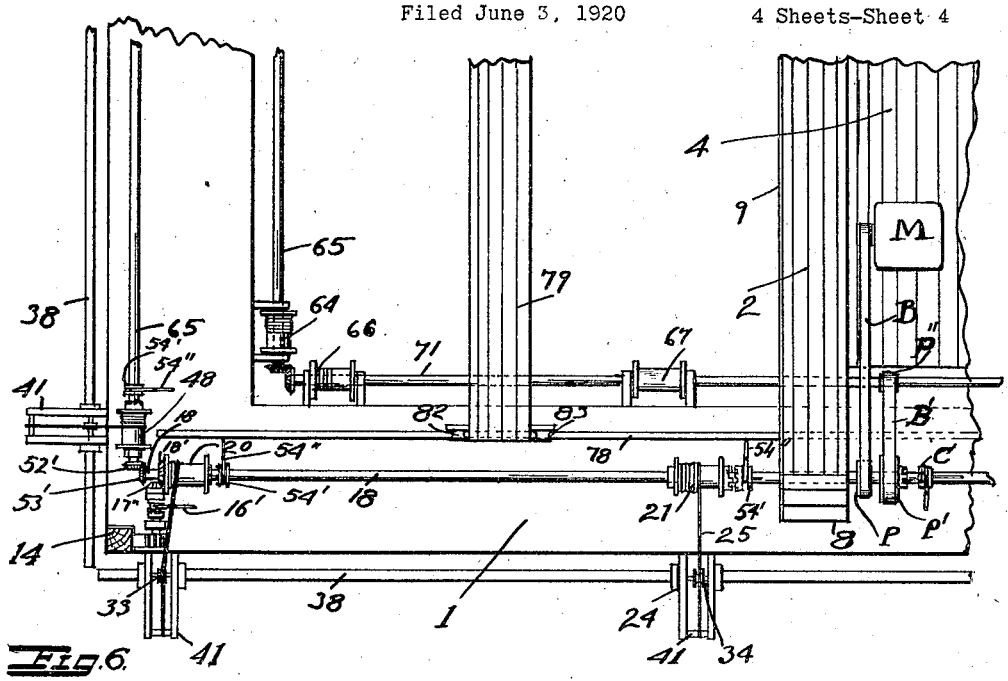
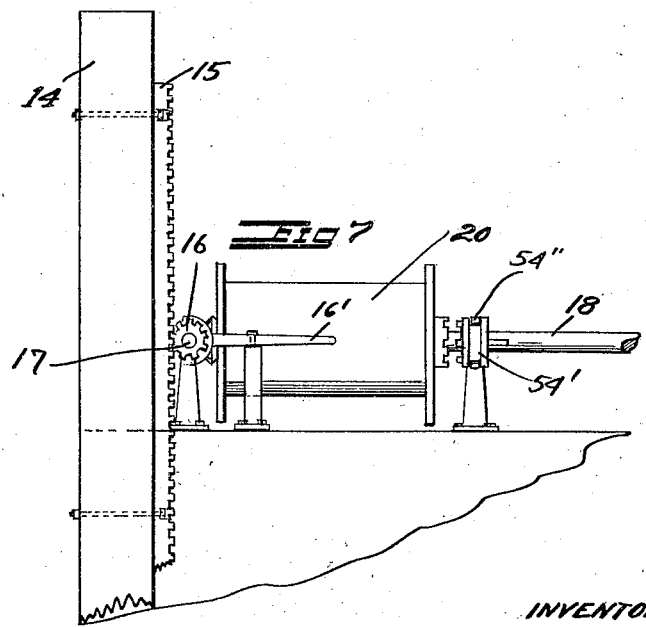
INVENTOR
Henry Podolsky
BY
Carlos P. Griffin
ATTORNEY Patented Nov. 20, 1923.

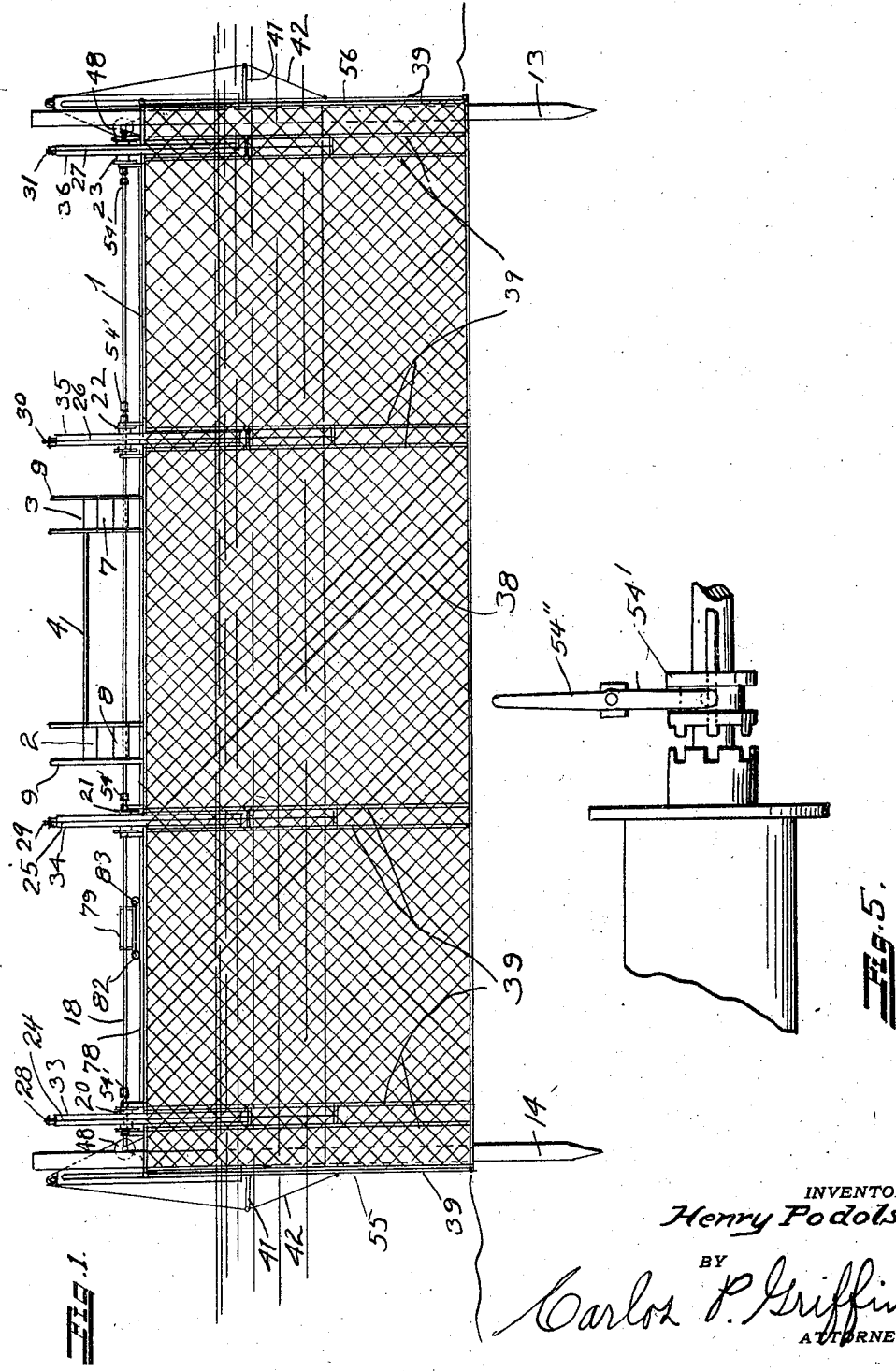

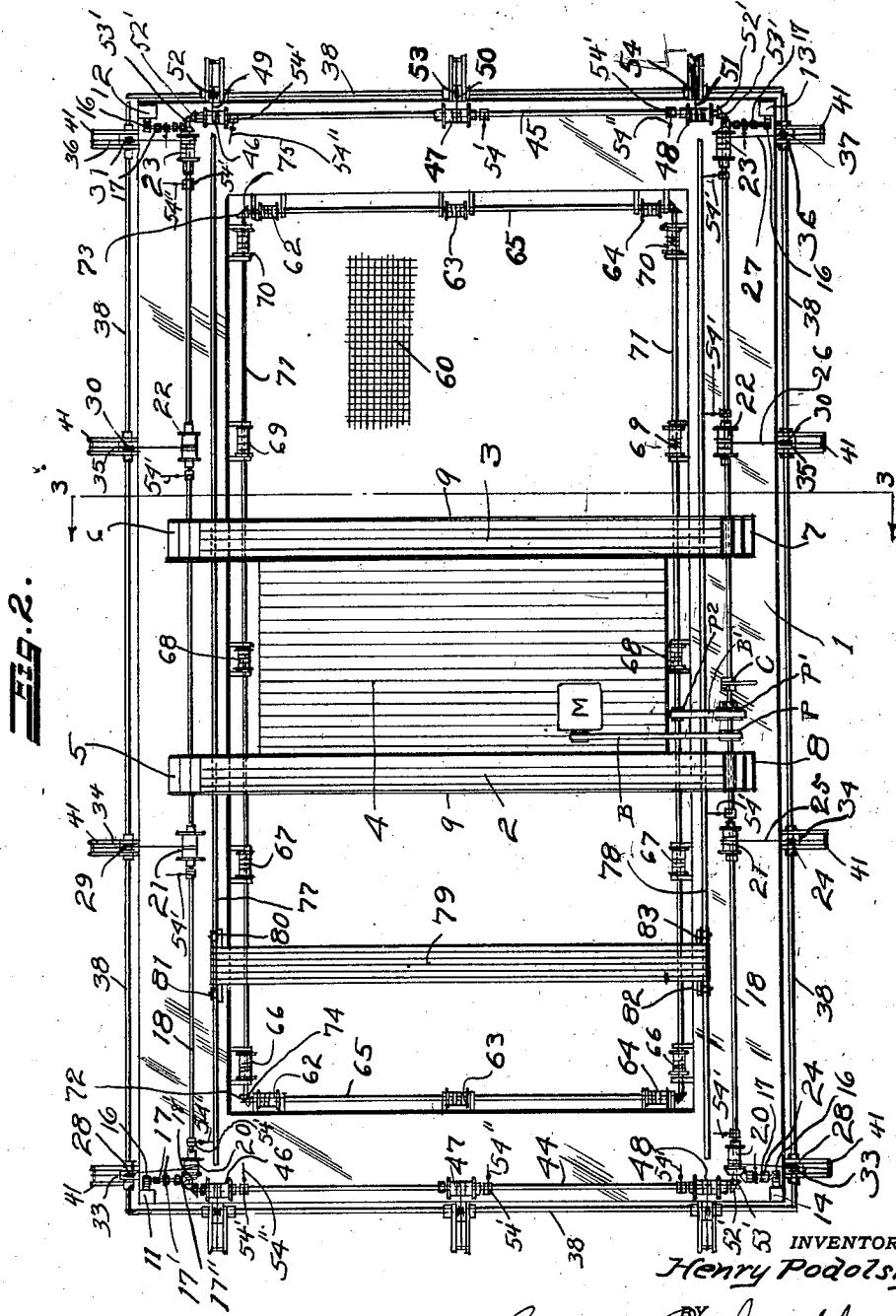

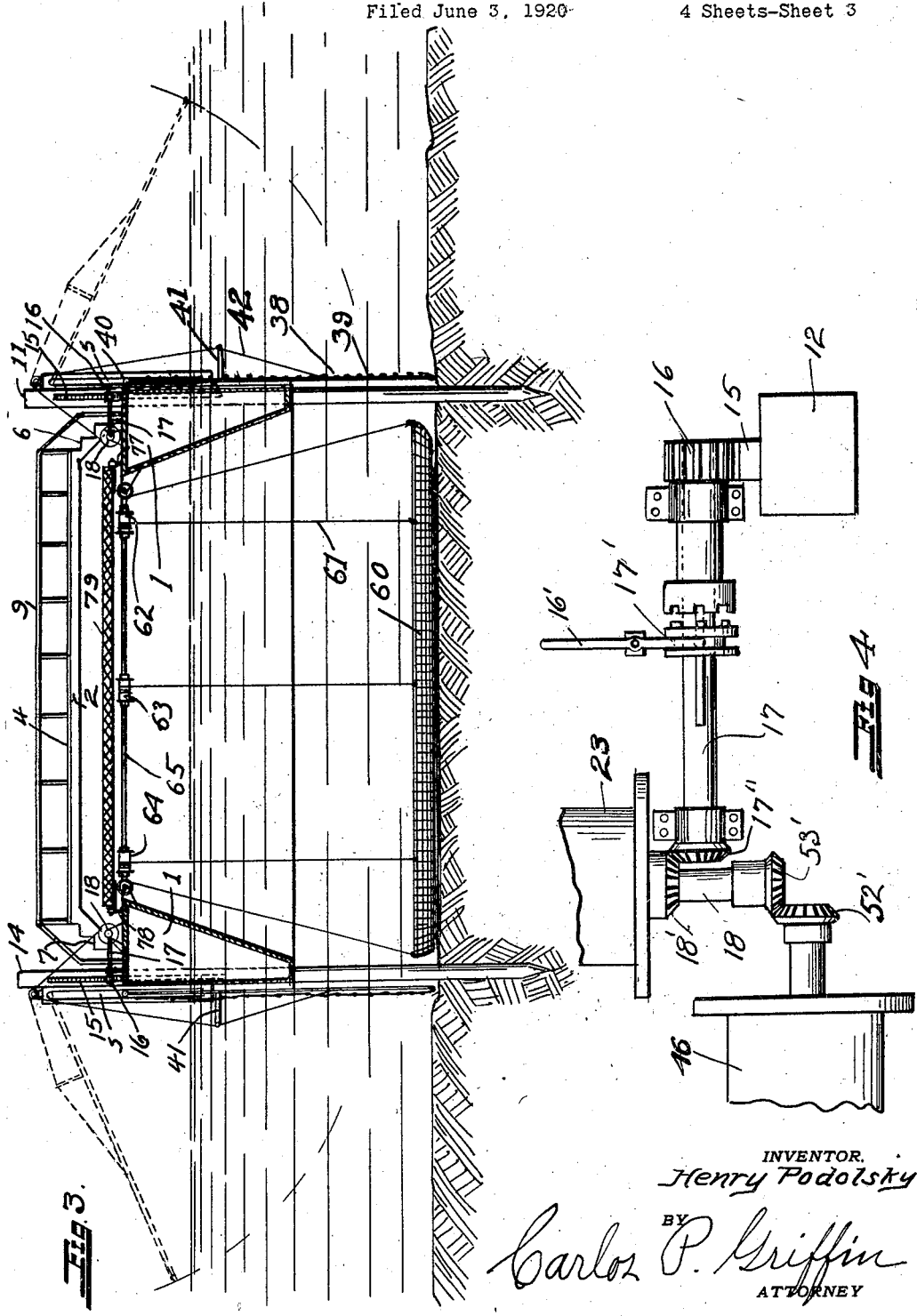

1,474,731

UNITED STATES PATENT OFFICE.

HENRY PODOLSKY, OF SAN FRANCISCO, CALIFORNIA.

FISHING APPARATUS.

Application filed June 3, 1920. Serial No. 386,183.

*To all whom it may concern:*

Be it known that I, HENRY PODOLSKY, a citizen of the United States, residing at 789 Howard St., San Francisco, Cal., in the county of San Francisco, State of California, have invented a new and useful Fishing Apparatus, of which the following is a specification in such full and clear terms as will enable those skilled in the art to construct and use the same.

This invention relates to a fishing apparatus and its object is to provide means whereby a net may be used to obstruct as much of a stream as may be desired to catch the fish swimming therein.

Another object of the invention is to provide means whereby the fishing apparatus may be stationed at one point or may be moved to another point at will. Suitable spuds being used to secure pontoons in the desired location.

Another object of the invention is to provide a bridge which may be moved along the pontoons to enable the work-men to remove the fish from the net.

A further object of the invention is to provide means whereby the side and end nets may be raised to allow the fish to pass into the enclosure from which they are to be taken by a net covering the entire bottom of said enclosure.

Other objects of the invention will appear as the description proceeds.

An embodiment of the invention is shown in the accompanying drawings in which the same reference numeral is applied to the same portion throughout, but I am aware that there may be modifications thereof.

Figure 1 shows a side elevation of the complete apparatus.

Fig. 2 is a plan view of the complete apparatus.

Fig. 3 is a sectional view of the apparatus on the section line 3—3 Fig. 2.

Fig. 4 is a plan view of the shaft arrangement for raising the spuds.

Fig. 5 is a side elevation on an enlarged scale of one of the side and end net raising drums showing the clutch therefor.

Fig. 6 is a plan view of one portion of the apparatus at a corner thereof on a larger scale than Fig. 2.

Fig. 7 is a side elevation on a larger scale than Fig. 1 of a corner of the apparatus showing one of the spuds and the means for lifting it.

The apparatus comprises a rectangular vessel consisting of a plurality of pontoons, each of which is indicated by the numeral 1, each pontoon being wider in cross section at the top than at the bottom, the space between the side and end pontoons is entirely open. The pontoons are connected together, and the vessel they form will be from 50 to 75 feet wide and from 100 to 200 feet long, as may be desired, but the size of the vessel will be immaterial to the present invention.

Mounted upon two bridges 2 and 3 is a suitable floor 4, said floor being reached by steps 5 to 8 inclusive from the decks of the said pontoons. The floor is provided with rails as indicated at 9 and has such machinery thereon as may be necessary to operate the apparatus.

At each of the four corners of the pontoons there is a vertically slidable spud as indicated at 11 to 14 inclusive, each of the spuds is provided with a rack as indicated at 15, which rack is engaged by the gear 16 on a shaft 17 for raising and lowering the spud. The shafts 17 are driven from a suitable longitudinal shaft 18 extending along the entire length of each of the side pontoons, there being two of said shafts. The shafts 18 are driven from any suitable motor M mounted upon the bridge 4, but which forms no part of the present invention and therefore is not illustrated in detail, but each of said shafts is also provided with four drums as indicated at 20 to 23 inclusive, which drums wind up the cables 24 to 27, said cables passing over pulleys 28 to 31 on the tops of suitable guides on the outer edges of the said pontoons.

The guides upon which the pulleys are mounted are indicated at 33 and 36 inclusive and each guide is provided with slots as indicated in Fig. 3. The side net 38 is carried by a suitable frame-work having rods 39 curved at their upper ends and carrying rollers 40 slidable in the slots of the guides 33 to 36. About one-third the length of the rods there is a horizontally extending post 41, which is connected to the cables 24 to 27 inclusive and a stay wire 42 braces each of said posts.

At the ends of the shafts 18 there are two shafts 44 and 45, upon which shafts are the drums 46 to 48 inclusive. Said drums having cables 49 to 51 inclusive passing over pulleys on the top of the guide posts 52 to 54, precisely the same as the side nets by which the end nets 55 and 56 are raised. Ordinarily no attempt is made to raise the side or end nets any further than the top of the water as indicated in Fig. 3. Bevelled gears 52' and 53' enable one of the side shafts 18 to drive the end shafts 44, 45. Both the side shafts 18 are provided with bevel gears at their ends so either one can drive the end shafts and the opposite side shaft 18. Each of the drums 20 to 23 inclusive as well as the drums 46 to 48 inclusive is provided with a clutch 54' operated by a suitable lever 54'' to enable any desired set of drums to be operated, since ordinarily only one side net or one end net is raised at a time.

It will be observed that owing to the short length of the post 41, that the first movement of the cable is to raise the side or end nets off the bottom and further movement of the cables will raise the nets to the position indicated in Fig. 3. A suitable reinforced net 60 substantially as large as the entire space between the spuds, and side and end nets is used to cover the bottom. This net is raised by a plurality of cables 61 along the side and ends of the net. These cables pass over drums 62 to 64 inclusive on the end shafts 65 and over the drums 66 to 70 on the side shafts 71. The side shafts 71 are driven from any suitable motor installed upon the platform of the bridge 4, but which forms no part of the present invention and the shaft receiving power has bevel gears 72 and 73 to drive the bevel gears 74 the two end shafts 65 which latter drive the shaft 71 on the opposite side. The motor for the operation of the apparatus may be electrically driven, or may be a steam engine or an ordinary gas engine, but it forms no part of the present invention. It is connected with the driving shafts by any suitable belt or chain.

Extending along the inner edge of each pontoon is a rail as indicated at 77 and 78 and a smaller bridge 79 mounted on four wheels 80 to 83 inclusive may be moved along the pontoons to enable the workmen to remove the fish from the net 60 when it has been raised to the surface of the water.

It will be observed that the bridge 79 may be moved entirely under the two bridges 2 and 3 and their connecting platforms 4.

Each of the shafts 17 is provided with a clutch 17' operated by a suitable lever 16'' and with a gear 17'' in mesh with gears 18' on the ends of the shafts 18. The object being to enable the spuds to be raised at will.

In operation the pontoon is towed to a suitable location where the water is of the desired depth and the spuds are lowered to hold the pontoons in the desired position, thereupon one side and both end nets or one end net and both side nets may be lowered. One net being allowed to remain open until it is estimated that the desired number of fish have passed into the space under the pontoons and over the net 60, thereupon the remaining side or end net is lowered and the shafts 65 and 71 are operated to raise the net 60, whereupon the workmen can move along the bridge 79 and collect the fish in the net 60 at will.

What I claim is as follows, but various modifications may be made in the construction shown in the drawings and above particularly described form, within the purview of my invention:

1. A fishing apparatus comprising a vessel open in the center, means for securing the vessel in a fixed position, nets adapted to completely surround the space enclosed by the vessel, means to raise or lower the nets on either side or either end of the vessel, a bottom net adapted to cover substantially the entire space enclosed by the first nets and means to raise said bottom net at will.

2. A fishing apparatus comprising vessel open in the center, side and end nets adapted to enclose the space surrounded by the vessel, means to raise and lower said side and end nets at will, a bottom net adapted to enclose the entire space covered by the side and end nets and means to raise said bottom nets without raising the side and end nets.

3. A fishing apparatus comprising a vessel open in the center, spuds for securing said vessel in a fixed position, side and end nets for enclosing the space surrounded by the vessel, means to raise and lower said side and end nets at will individually, a net adapted to lie upon the bottom and cover substantially the entire space included within the side and end nets, means to raise the bottom net to the surface of the water and a bridge movable along the vessel, over the bottom net for collecting the fish thereon.

4. A fishing apparatus comprising a vessel enclosing a rectangular space, a slidable spud at the four corners of the rectangular space, nets for the sides and ends of the vessel to enclose the space covered thereby, means to raise and lower said nets at will, a bottom net adapted to enclose substantially the entire space covered by the first nets means to raise said bottom net and a bridge slidable along the vessel for collecting the fish upon the bottom net.

5. A fishing apparatus comprising a vessel adapted to enclose a rectangular space, side and end nets to enclose the space covered by the vessel, slides in which said nets are vertically movable, cables for raising the side and end nets individually, a bottom net adapted to cover substantially the entire bottom enclosed by the first nets and means to raise said bottom net at will.

In testimony whereof I have hereunto set my hand this 28th day of May, A. D. 1920.

HENRY PODOLSKY.